L. F. ADT.
EYEGLASSES.
APPLICATION FILED MAY 10, 1907.
963,349.
Patented July 5, 1910.
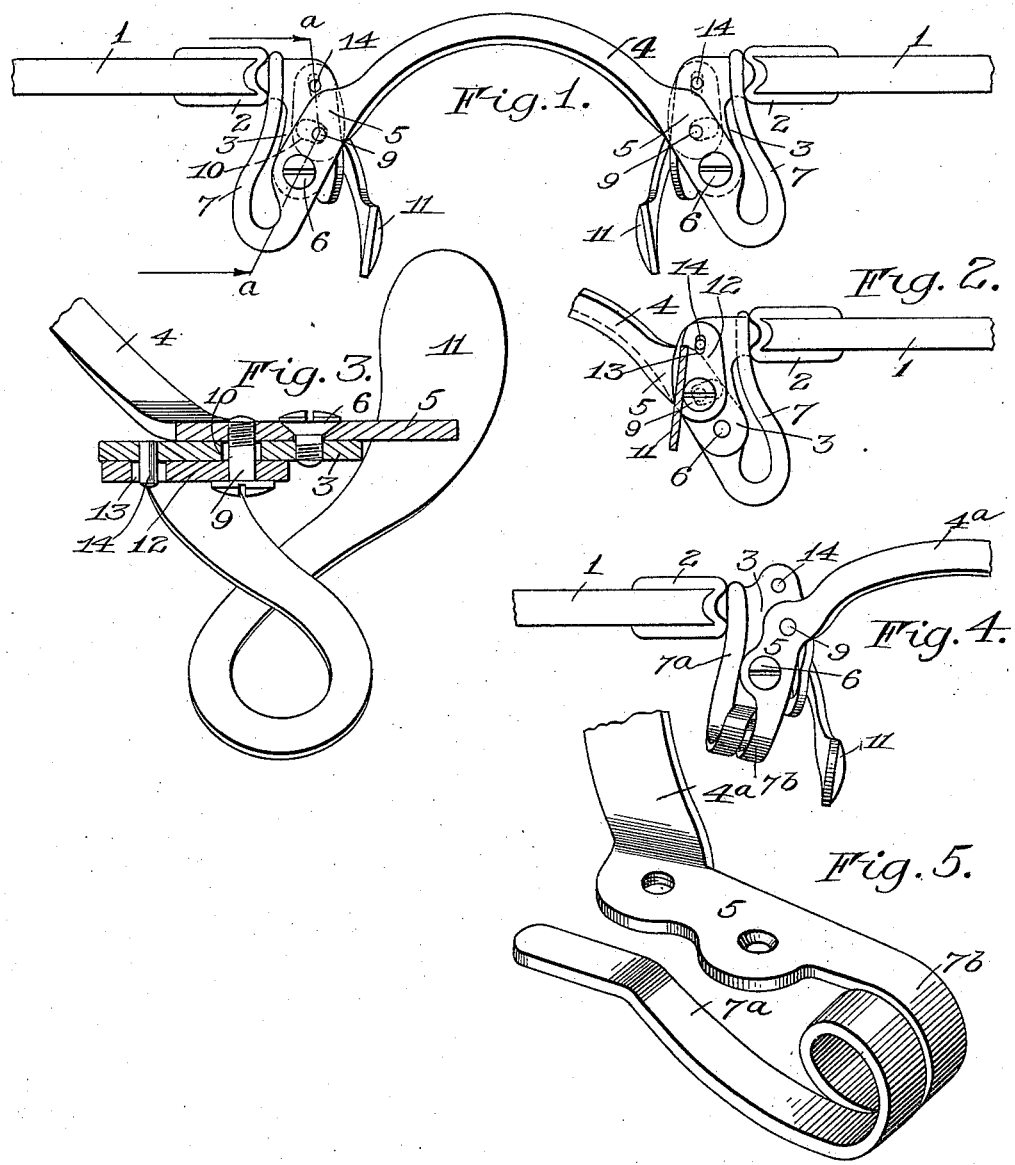

UNITED STATES PATENT OFFICE.

LEO F. ADT, OF ALBANY, NEW YORK.

EYEGLASSES.

963,349. Specification of Letters Patent. Patented July 5, 1910.

Original application filed June 28, 1906, Serial No. 323,924. Divided and this application filed May 10, 1907. Serial No. 372,844.

*To all whom it may concern:*

Be it known that I, LEO F. ADT, of Albany, in the county of Albany and State of New York, have invented certain new and useful Improvements in Eyeglasses; and I do hereby declare the following to be a full, clear, and exact description of the same, reference being had to the accompanying drawings, forming a part of the specification, and to the reference-numerals marked thereon.

This invention relates to eyeglasses and particularly to that type in which the nose guards move substantially in a horizontal plane toward and from the nose, an object of this invention being to provide an improved manner of forming and mounting the springs which serve to proximate the nose guards.

To these and other ends the invention consists in certain improvements and combinations of parts all as will be hereinafter more fully described, the novel features being pointed out in the claims at the end of the specification.

In the drawings: Figure 1 represents a top plan view of a pair of eyeglasses constructed in accordance with this invention, portions only of the lenses being shown and the guards being in proximated position. Fig. 2 is a bottom view of the connection between the bridge and one of the lenses, the guard being partially removed. Fig. 3 is a section on the line $a$—$a$ of Fig. 1 in the direction of the arrows. Fig. 4 is a bottom view of another embodiment of the connection between the bridge and a lens. Fig. 5 is a detail perspective view of the spring arm forming a continuation of the bridge, as shown in Fig. 4.

Similar reference numerals in the several figures indicate similar parts.

In an application filed by me on the 28th day of June, 1906, I have illustrated several embodiments of eyeglasses in which the bridge is provided with resilient or yielding portions serving to proximate the nose guards. The aforesaid application, in addition to containing generic claims to all of these embodiments, contains claims specific to one embodiment. This application is presented to protect specific features in other embodiments of my aforesaid application, and is, therefore, a division of the latter.

With particular reference to the form shown in Figs. 1 to 3, 1 indicates the lenses and 2 suitable lens-attaching members, each of which is preferably provided with a rearwardly extending horizontal arm 3. A bridge 4, made of substantially rigid material of flat stock, is twisted slightly near opposite ends to provide horizontal portions 5 formed with vertical bearings for pivots such as screws 6, which connect the horizontal portions of the bridge with the upper face of the rearwardly-extending horizontal arms 3 near the rear ends of the latter. The bridge 4 at each side thereof carries forwardly projecting spring arms 7 which, near their free ends, slidingly engage the lens-attaching members 2 and serve to swing the outer ends of the lenses toward the rear. The arms 7 are integral with the bridge and are preferably formed by doubling the ends of the flat stock edgewise in a horizontal plane so that the edge only of the metal is presented to the wearer.

To limit the swinging of the lenses 1, lugs or pins 9 project from the bridge downwardly in advance of the pivots and through curved slots 10 in the lens-attaching members 2, being engaged by the end walls of the slots at the ends of the swinging movements.

The nose guards 11 may be of any suitable construction, but preferably each is formed with a horizontal portion 12 which, by one of the pins 9 is pivotally secured to the under face of one of the lens-attaching members 2. Each nose guard is further formed in its horizontal portion with a slot 13 in which works a pin 14 depending from the adjacent lens-attaching member in advance of the pivot 9. It will be noted that the nose guards are pivotally connected with the bridge and with the lens-attaching members in different vertical planes, to one side or in advance of the pivots of the lens attaching members on the bridge thereby causing the movement of the lens to be increased or amplified in the nose guards.

In the embodiment shown in Figs. 4 and 5, the parts are constructed in substantially the same manner, except that the yielding or resilient extensions or arms $7^a$ of the bridge $4^a$ are bent widthwise of the stock to provide one or more convolutions making a preferably helical loop or coil $7^b$ arranged in a plane in the rear of the lenses and having its axis substantially horizontal and parallel to the plane of the lenses.

It will be noted that in all the present embodiments, the lenses are mounted to swing in a substantially horizontal plane to proximate the nose guards and that the lenses are held in their normal position by springs forming portions of the bridge and slidingly engaging with swinging portions of the mounting, in this instance, the lens-attaching members but of course the bridge with its spring portions may be embodied in eyeglasses of other types than those in which the lenses move.

In this application I do not claim broadly the mounting of the lens attaching members to swing in a substantially horizontal plane on the bridge in combination with swingingly mounted nose guards turning about axes different from or unalined with the axes of the lens attaching members, as this feature is claimed broadly in my application No. 323,924, of which this application is a division.

I claim as my invention:

1. In an eyeglass mounting, the combination with a bridge, and a lens-attaching member mounted to swing substantially in a horizontal plane relatively to the bridge, of a spring arm extending from one of said parts and slidingly engaging the other to hold the lens-attaching members in normal position and a nose guard moved with the lens-attaching member.

2. In eyeglasses, the combination with a bridge, a pair of lenses, and lens-attaching members pivoted to the bridge to permit the lenses to swing in a substantially horizontal plane, of springs forming portions of the bridge beyond said pivots and slidingly engaging the lens-attaching members to hold the lenses in normal position.

3. In an eyeglass mounting, the combination of a bridge having integral spring arms extending therefrom, and lens-attaching members mounted to swing relatively to the bridge and slidingly engaged by the arms so as to be retained in normal positions.

4. In an eyeglass mounting, the combination with a lens-attaching member and a nose guard, of a bridge connected with the lens-attaching member to permit a turning movement of the latter substantially in a horizontal plane for operating the nose guard and formed with an integral spring arm having sliding engagement with the lens-attaching member to position the nose guard.

5. In eyeglasses, the combination with a pair of lenses, and lens-attaching members therefor, of a bridge to which the lens-attaching members are connected so as to swing in a substantially horizontal plane, said bridge being provided with integral spring arms slidingly engaging the lens-attaching members.

6. In an eyeglass mounting, the combination with a bridge, lens attaching members mounted to swing relatively to the bridge, and nose guards having connection with the bridge and the lens attaching members to insure an increased movement therein when the lenses are moved, of springs forming portions of the bridge and slidingly engaging the lens-attaching members.

7. In an eyeglass mounting, the combination of a bridge having forwardly extending spring arms at its ends, and lens-attaching members mounted to swing in a substantially horizontal plane and slidingly engaged by the arms.

8. In an eyeglass mounting, the combination of a bridge having horizontal portions near each end and also having spring arms extending therefrom beyond the horizontal portions, with lens-attaching members slidingly engaged by the spring arms and having horizontal portions pivoted to the horizontal portions of the bridge.

9. An eyeglass bridge formed with vertical bearings and forwardly projecting spring arms beyond the bearings having coils therein.

10. In an eyeglass mounting, the combination with a bridge and a lens-attaching member pivoted thereto to turn about a vertical axis, of a nose guard mounted to swing on the bridge about a different vertical axis, and means connecting the lens-attaching member and the guard for amplifying the movement of the latter.

11. In an eyeglass mounting, the combination with a bridge and a lens-attaching member pivoted thereto to turn about a vertical axis, of a nose guard mounted to swing on the bridge about a different vertical axis and engaged by the lens attaching member in advance of the pivot of the bridge and the lens-attaching member so as to be operated upon the movement of the latter.

12. In an eyeglass mounting, the combination with a bridge and a lens-attaching member pivoted thereto to turn about a vertical axis, of a nose guard mounted to swing on the bridge about a different vertical axis and pivotally connected to the lens-attaching device, the swinging point of the guard on the bridge and its pivotal connection with the lens-attaching member both being located to one side of the pivot provided between the bridge and the lens attaching member.

13. In eyeglasses, the combination with a bridge having integral spring portions and lenses pivoted to the bridge, of nose guards pivotally mounted on the bridge, and having connections with the spring portions to cause the latter to position them.

14. In an eyeglass mounting, the combination with a bridge comprising a bridging portion and a spring portion, of a lens pivoted to the bridge at a point between the bridging portion and the spring portion, and a nose guard movable relatively to the lens and positioned by the spring portion.

15. In an eyeglass mounting, the combination with a bridge comprising a bridging portion and a forwardly extending spring arm, of a lens pivoted to the bridge at a point between the bridging portion and the spring arm, and a nose guard having pivotal connection with the bridge between the bridging portion and the spring arm, and positioned by the latter.

16. In eyeglasses, the combination with a bridge, comprising a bridging portion, vertical bearings and spring portions beyond the bearings, with nose guards mounted to turn on the vertical bearings and positioned by the spring portions, and lenses pivotally connected to the bridge between the bridging and the spring portions.

17. In eyeglasses, the combination with a bridge having spring portions, and lens attaching members pivoted to the bridge and engaged by the spring portions, of nose guards movable relatively to the bridge and to the lens attaching member and operated by the movement of the lenses.

18. In eyeglasses, the combination with the lenses, and nose guards, of a bridge having resilient portions for positioning the lenses, and pivots connecting the lenses with the bridge at points intermediate the resilient portions of the latter.

19. In eyeglasses, the combination with the lenses, and nose guards, of a bridge pivoted to the lenses and resilient portions forming integral parts of the bridge and serving as springs to operate the lenses.

20. In eyeglasses, the combination with the lenses, and nose guards adapted to operate by the movement of the lenses, of a bridge pivoted to the lenses, and resilient portions forming continuations of the bridge beyond the pivot points thereof and adapted to yield when the lenses are operated.

21. In eyeglasses, the combination with the lenses, and nose guards, of a bridge pivoted to the lenses, and resilient loops formed of continuations of the bridge beyond the pivot points, the free arms of the loops engaging parts movable with the lenses.

22. In eyeglasses, the combination with the lenses and nose guards, of a bridge pivoted to the lenses for guiding them in turn in a horizontal plane, and resilient portions in rear of the lenses forming continuations of the bridge beyond its pivot points and serving as springs for operating the lenses.

23. In eyeglasses, the combination with the lenses having suitable attaching devices thereon, and nose guards, of a bridge, pivot pins connecting the bridge and attaching devices, and resilient portions forming extensions of the bridge beyond the pivot pins and serving to operate the lenses.

24. In eyeglasses, the combination with the lenses having suitable attaching devices thereon, of a bridge, pivots connecting the latter and the attaching devices, extended portions of the bridge beyond the pivots serving as springs to operate to turn the lenses, and guards arranged to be operated by the relative turning movement of the lenses.

LEO F. ADT.

Witnesses:
MICHAEL F. O'CONNOR,
LUCY B. CLEXTON.